United States Patent [19]

Bertin et al.

[11] Patent Number: 5,687,167

[45] Date of Patent: Nov. 11, 1997

[54] METHOD FOR PREEMPTING CONNECTIONS IN HIGH SPEED PACKET SWITCHING NETWORKS

[75] Inventors: Olivier Bertin, Nice; Jean-Paul Chobert, Carros; Olivier Maurel, Le Cannet; Alain Pruvost, Vallauris, all of France

[73] Assignee: International Business Machines Corporation, Armonk, N.Y.

[21] Appl. No.: 561,964

[22] Filed: Nov. 22, 1995

[30] Foreign Application Priority Data

Nov. 24, 1994 [EP] European Pat. Off. .......... 94480143

[51] Int. Cl.$^6$ .................................... H04L 12/44
[52] U.S. Cl. ..................... 370/254; 370/406; 370/444
[58] Field of Search ............................... 370/229, 230, 370/235, 254, 256, 289, 400, 406, 410, 442, 443, 444, 462

[56] References Cited

U.S. PATENT DOCUMENTS 4,827,411  5/1989  Arrowood et al. .................. 370/254
5,128,932  7/1992  Li ............................................ 370/400
5,231,631  7/1993  Buhrke et al. ........................ 370/400
5,231,633  7/1993  Hluchyj et al. ...................... 370/94.1
5,467,345  11/1995  Cutler, Jr. et al. .................. 370/400

FOREIGN PATENT DOCUMENTS 0239979  10/1987  European Pat. Off. .
0348331  12/1989  European Pat. Off. .

OTHER PUBLICATIONS

Data Communication Symposium Oct. 1983 USA pp. 181–187.
M. V. Beckner et al "Graceful Preemption for Multilink Layer Protocols".

Primary Examiner—Benedict V. Safourek

[57] ABSTRACT

High speed network nodes can establish new connections by preempting existing ones when insufficient bandwidth is available in the network. Numerous preemption priorities are arranged in a limited number of groups and a median priority level is defined within each group. This median, stored in the topology database of each node of the network, permits better bandwidth utilization per group while consuming very little memory space and generating very low traffic overhead.

8 Claims, 9 Drawing Sheets

FIG. 7

| PRIORITY GROUP 0 | | LINK VALUES | | | | |
|---|---|---|---|---|---|---|
| NAME | DESCRIPTION | A | B | ... | N | |
| $M$ | SUM OF CONNECTIONS BIT RATE | $M_A$ | $M_B$ | ... | $M_N$ | |
| $\sigma^2$ | SUM OF CONNECTIONS VARIANCE | $\sigma^2_A$ | $\sigma^2_B$ | ... | $\sigma^2_N$ | |
| $\hat{C}$ | RESERVED EQUIVALENT CAPACITY | $\hat{C}_A$ | $\hat{C}_B$ | ... | $\hat{C}_N$ | |
| DMP | DYNAMIC MEDIAN PRIORITY | $DMP_A$ | $DMP_B$ | ... | $DMP_N$ | |

PRIORITY GROUP 1

⋮

PRIORITY GROUP M

METHOD FOR PREEMPTING CONNECTIONS IN HIGH SPEED PACKET SWITCHING NETWORKS

TECHNICAL FIELD

The present invention relates to a process, in high speed packet switching networks, for establishing new connections by preempting existing ones when insufficient bandwidth is available, and more particularly, to the arrangement of numerous preemption priorities in a limited number of priority groups.

BACKGROUND ART

High Performance Networks

There is a strong requirement that today's data transmission networks be able to support distributed computing applications running over high speed multiprotocol networks that can carry local area network communications, voice, video, and data traffic among channel attached hosts, business, and engineering workstations, terminals, and small to intermediate file servers. This vision of a high speed multiprotocol network is the driver for the emergence of fast packet switching networks architectures in which data, voice, and video information is digitally encoded, chopped into small packets and transmitted through a common set of nodes and links.

Throughput

A key requirement for these new network architectures is to reduce the end-to-end transmission delay in order to satisfy real time delivery constraints and to achieve the high nodal throughput necessary for the transport of voice and video. Increases in link speeds have not been matched by proportionate increases in the processing speeds of communication nodes and the fundamental challenge for high speed networks is to minimize the packet processing time within each node. In order to minimize the processing time and to take full advantage of the high speed/low error rate technologies, most of the transport and control functions provided by the new high bandwidth network architectures are performed on an end-to-end basis. The flow control and particularly the path selection are managed by the access points of the network which reduces both the awareness and the function of the intermediate nodes.

Bandwidth Management

Communication networks have at their disposal limited resources to ensure efficient packet transmission. The limitations are principally link bandwidth, node processing capacity and buffer size. When traffic demand increases, a network may become congested, resulting in degraded network performance expressed in terms such as actual throughput, average transfer delay of packets through the network, and the number of packets lost in transit or received containing errors.

An ideal network should be able to transmit all traffic offered to the network until the offered traffic reaches the network's maximum transmission capacity. Beyond this limit, the network should operate at its maximum capacity whatever the demand is. In reality, network operations diverge from the ideal for a number of reasons which are all related to the inefficient allocation of resources in congested environments. In particular, the size of the queues on the links can increase with increased traffic, but only to the capacity of the buffers in the nodes. Packets which cannot be buffered are discarded. Retransmission of discarded packets propagate congestion towards links located upstream, generating additional internal traffic. There is an avalanche phenomenon due to the fact that beyond a certain limit, the useful transport capacity of the network decreases when the demand for traffic increases.

For its operation to be satisfactory, the network must be implemented so as to avoid congestion. The simplest solution obviously consists in increasing the capacity of the network. This solution is generally undesirable for evident reasons of costs. To support efficient network operation, it is necessary to apply a certain number of preventive measures of which the main ones are:

- flow control for limiting admission of data into the network to a rate compatible with what the receiver can absorb;
- load regulation for globally limiting the number of packets present in the network to avoid an overloading of the resources; and
- load balancing for fairly distributing the traffic over all the links of the network to avoid a local congestion in particular resources.

Call Set Up

Bandwidth management in most high speed packet communications networks utilizes connection level controls applied at the time the connection is set up based on the load characteristics of the transmission links in the connection route. Such connection level controls include bandwidth allocation, path selection, admission control and call set up. Bandwidth allocation is accomplished by noting, at the connection set up time, the "equivalent capacity" loading that the new connection will generate, based on the traffic characteristics of the source signal and the desired quality of service. Using this equivalent capacity as the bandwidth that must be available to carry the new connection, the originating node of the network computes a path to the destination node that is capable of carrying the new connection and providing the level of service required by the new connection. This path selection process utilizes data describing the current state of the traffic in the entire network. Such data can be stored in a topology database located at each node of the network. If no suitable path can be found to meet these requirements, the connection is rejected. Once a suitable path has been selected at the entry node, a set up message is generated which traverses the selected route, updating the resource allocations for each link visited by the set up message.

Connection Priority

In order to successfully manage the traffic and to efficiently accommodate connections for data streams with widely different characteristics (data, voice, video), it is important at the call set up: first, to reserve bandwidth for each connection from the knowledge of the source characteristics, the network status; and secondly, when no bandwidth is available, to preempt connections in an intelligent manner according to the call priority.

Modern network architectures have introduced a large range of connection priorities to cope with the various properties of the source: burstiness, quality of service, error or loss probability; etc. Connections priorities specify the relative importance of connections in the network, that means the order in which connections can be eventually released or submitted to a degradation of their quality of service. More particularly, connection priorities are used by the path selection process to determine the feasibility of a potential route for a new connection in the loaded network. When not enough resource is available to provide a path to a new connection, some existing connections may be terminated in order to allow the new connection to be established on the link if this one has a higher priority.

Connection priority is not related to the order in which data packets are transmitted in the network. The problem of the transmission of urgent packets is handled by a specific packet scheduling process. The delay priority determines, for each type of traffic (for example, real time versus non-real time traffic), what service a packet will receive at each intermediate hop of its path from the origin to the destination node. The same delay priority is assigned to every packet that flows in the same network connection.

The objective of managing network connection requests where the data can have any of a high number of priorities makes path selection difficult and requires an enormous amount of information to monitor as well as to store in the topology database within the nodes. These priorities could lead to an excessive control flow overhead contributing to the congestion of the network and to the degradation of the processing throughput in the nodes.

Priority Groups

The present invention enables more efficient use of the resources and particularly of the bandwidth available in high bandwidth networks operating with multiple preemption priorities.

A first step is to define a limited number of priority groups to use in the routing functions. The target is to select the best path according to the bandwidth available within the low number of priority groups previously defined. The bandwidth used by the network connections is not known for each connection priority value but only for each priority group. A first approach is to consider only the bandwidth of inferior preemption groups as potentially available, as no information is available on the distribution of the priorities in a given priority group. However, for sixtyfive priority values arranged in four priority groups, for example, the network path selection mechanism can be imprecise or can even fail in finding a route in the network though a route is actually feasible. This problem is likely to occur especially when the network is highly loaded.

A second step is to compute, from the cumulated bandwidth information associated with each priority group stored in the Topology Database, a median priority level defined as the priority level that divides the used bandwidth of the group in two equal parts. Connections can be established even if not enough bandwidth exists in groups with lower holding priorities or when new connections belong to the lower group, by preempting, in some situations, connections in their own group. The median priority allows a much better knowledge of the bandwidth utilization per group on a link while consuming very little memory space and generating very low traffic overload.

SUMMARY OF THE INVENTION

The present invention discloses a method, in a packet switching communication network comprising a plurality of nodes interconnected with transmission links, for establishing a new connection and for reserving bandwidth between an origin node and a destination node, with a given requesting priority level by preempting, when insufficient bandwidth is available on a link, existing connections of lower holding priority levels, each node in the network comprising one or more communication adapters for receiving and transmitting data packets, a route controller (305) for allocating, controlling and managing network resources, and a topology database, updated by means of network control messages, for storing the network configuration and traffic characteristics, said method characterized in that it comprises the steps of: arranging connection priority levels according to an increasing order in predefined priority groups, each priority group comprising a plurality of priority levels; computing for each network link, and for each priority group, one or a plurality of dynamic intermediate priority levels, each priority level dividing the bandwidth reserved by existing connections into a predefined ratio; determining for each network link, and for each priority group, the bandwidth reserved by existing connections; storing and updating for each network link and for each priority group, said dynamic intermediate priority levels and said reserved bandwidth in the topology database of each node of the network; and establishing a connection with a given requesting priority level located in a given priority group by preempting, when insufficient bandwidth is available, existing connections with holding priority levels located in lower groups or in the same priority group than said given priority group.

DESCRIPTION OF THE DRAWINGS

FIG. 7 shows the bandwidth reservation information stored in the Topology Database according to the present invention.

DESCRIPTION OF THE PREFERRED EMBODIMENT OF THE INVENTION

High Speed Packet Switching Networks

Figure 2:
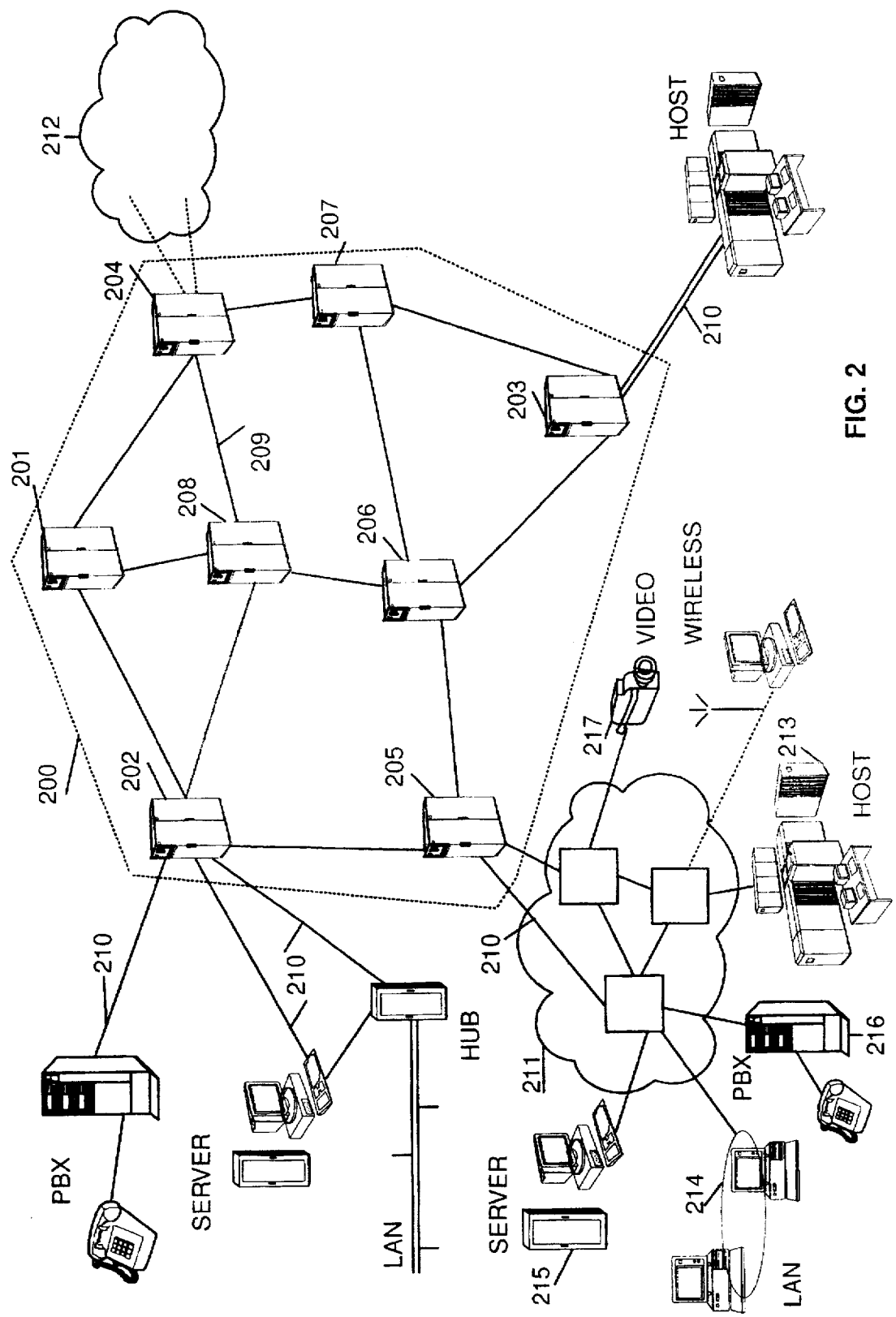
FIG. 2 shows a typical model of high speed packet switching network including the access and transit nodes claimed in the present invention.

As illustrated in FIG. 2, a typical model of communication system is made of several user networks (212) communicating through a high performance network (200) using private lines, carrier provided services, or public data networks. Each user network can be described as a set of communication processors and links (211) interconnecting large computers used as Enterprise Servers (213), user groups using workstations or personnel computers attached on LAN (Local Area Networks 214), applications servers (215), PBX (Private Branch eXchange 216) or video servers (217). These user networks, dispersed in different establishments, need to be interconnected through wide area transport facilities. Different approaches can be used for organizing the data transfer. Some architectures involve the checking for data integrity at each network node, thus slowing down the transmission. Others are essentially looking for a high speed data transfer. To that end the transmission, routing and switching techniques within the nodes are optimized to process the flowing packets towards their final destination at the highest possible rate. The present invention belongs essentially to the latter category and more particularly to the fast packet switching network architecture detailed in the following paragraphs.

Switching Nodes

The general view in FIG. 2 shows a fast packet switching transmission system comprising eight nodes (201 to 208) each node being interconnected by means of high speed communication lines called Trunks (209). The access (210) to the high speed network by the users is realized through Access Nodes (202 to 205) located at the periphery. These Access Nodes comprise one or more Ports, each one providing an access point for attaching external devices supporting standard interfaces to the network and performing the conversions required to transport the users data flow across the network from and to other external devices. For example, the Access Node 202 interfaces respectively a Private Branch eXchange (PBX), an application server and a hub through three Ports and communicates through the network by means of the adjacent Transit Nodes 201.208 and 205.

Each network node (201 to 208) includes a Routing Point where the incoming data packets are selectively routed on the outgoing Trunks towards the neighboring Transit Nodes. Such routing decisions are made according to the information contained in the header of the data packets. In addition to the basic packet routing function, the network nodes also provide ancillary services such as:

the determination of routing paths for packets originated in the node;

directory services like retrieving and updating information about network users and resources;

the maintaining of a consistent view of the physical network topology, including link utilization information; and the reservation of resources at access points of the network.

Each Port is connected to a plurality of user processing equipments, each user equipment comprising either a source of digital data to be transmitted to another user system, or a data sink for consuming digital data received from another user system, or, typically, both. The interpretation of the users protocols, the translation of the users data into packets formatted appropriately for their transmission on the packet network (200) and the generation of a header to route these packets are executed by an Access Agent running in the Port. This network layer header is made of Control, Routing and Redundancy Check Fields.

The Control Fields include, among other things, an encoded identification of the protocol to be used in interpreting the Routing Field.

The Routing Fields contain all the information necessary to route the packet through the network (200) to the destination End Node to which it is addressed. These fields can take several formats depending on the routing mode specified The Redundancy Check Fields are used to check for errors in the header itself. If an error is detected, the packet is discarded.

Routing Points

Figure 3:
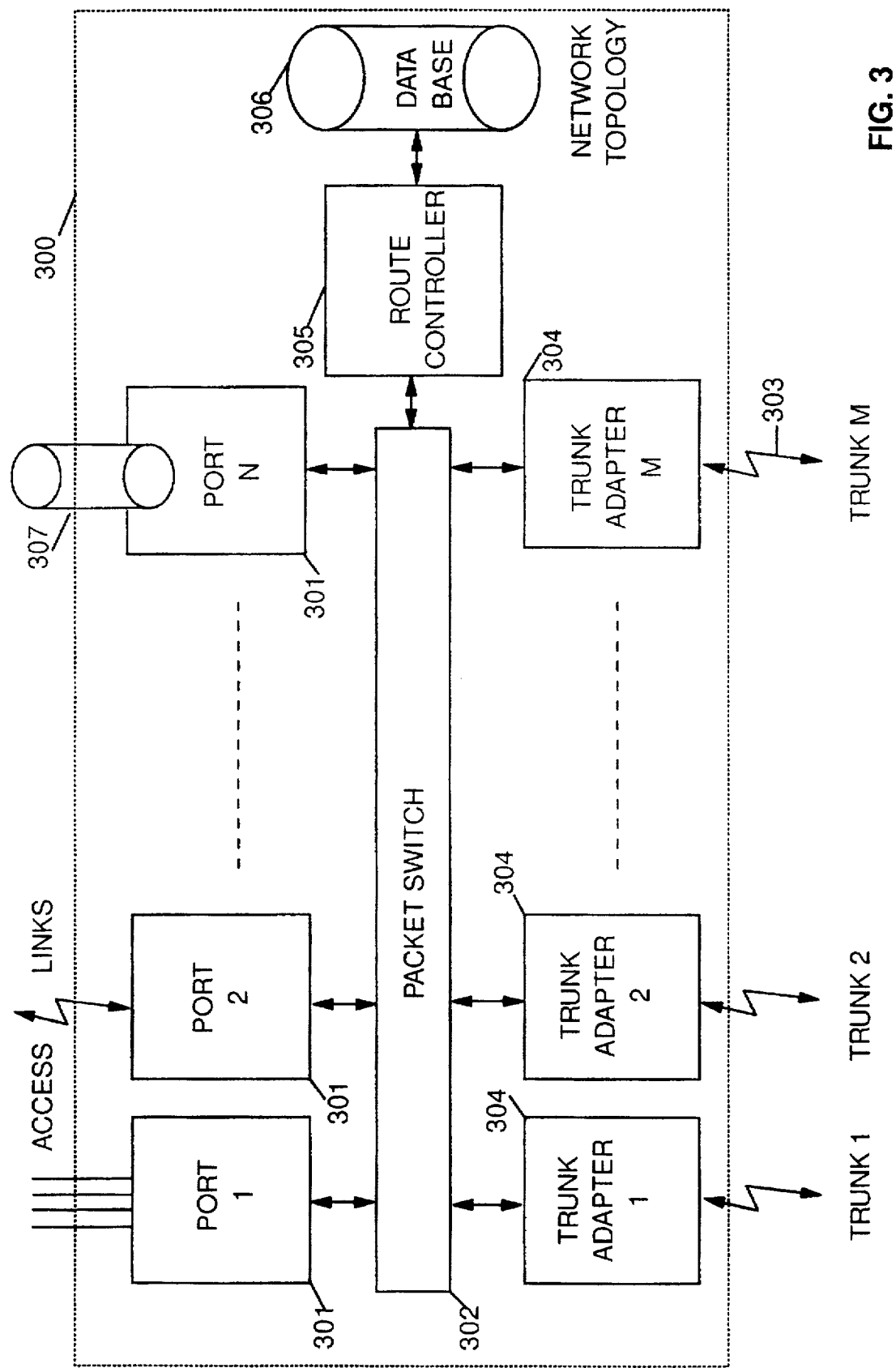
FIG. 3 describes a high speed Routing Point according to the present invention.

FIG. 3 shows a general block diagram of a typical Routing Point (300) such as it can be found in the network Nodes (201 to 208) illustrated in FIG. 2. A Routing Point comprises a high speed packet Switch (302) onto which packets arriving at the Routing Point are entered. Such packets are received from other nodes over high speed transmission links (303) via Trunk Adapters (304) from users via application adapters called Ports (301).

Using information in the packet header, the adapters (304, 301) determine which packets are to be routed by means of the Switch (302) towards a local user network (307) or towards a transmission link (303) leaving the Node. The adapters (301 and 304) include queuing circuits for queuing packets prior to or subsequent to their launch on the Switch (302).

The Route Controller (305) calculates the optimum routes through the network (200) so as to minimize the amount of network resources used to complete a communication path and builds the header of the packets generated in the Routing Point. The optimization criteria includes the characteristics of the connection request, the capabilities and the utilization of the Trunks in the path, the number of intermediate nodes; etc. All the information necessary for the routing, about the nodes and transmission links connected to the nodes, are contained in a Network Topology Database (306). Under steady state conditions, every Routing Point has the same view of the network. The network topology information is updated when new links are activated or new nodes added to the network. Such information is exchanged by means of control messages with all other Route Controllers to provide the necessary up-to-date information needed for route calculation (such database updates are carried on packets very similar to the data packets between end users of the network). The fact that the network topology is kept current in every node through continuous updates allows dynamic network reconfigurations without disrupting end users logical sessions.

The incoming transmission links to the packet Routing Point may comprise links from external devices in the local user networks (210) or links (Trunks) from adjacent network nodes (209). In any case, the Routing Point operates in the same manner to receive each data packet and forward it on to another Routing Point as dictated by the information in the packet header. The fast packet switching network operates to enable a communication between any two end user applications without dedicating any transmission or node facilities to that communication path except for the duration of a single packet. In this way, the utilization of the communication facilities of the packet network is optimized to carry significantly more traffic than would be possible with dedicated transmission links for each communication path.

Routing Modes

The routing within the network presents two aspects: (1) determining what the route for a given connection shall be; and (2) actually switching the packet within a switching node.

There are many methods of determining a route through a network. For very high throughput, once the route selected, the critical item is that the switching elements must be able to route an incoming packet in a very short portion of time. Driven by the requirements to keep transit node processing at a minimum, the transport services are designed to operate on an end-to-end basis so there is no hop-by-hop error recovery or re-transmission envisioned for high speed, high performance (low error) links. There is also no need for transit nodes to be aware of individual transport connections.

Data packets are routed and queued in the transit nodes according to the routing information contained in the header. Several routing modes can be used in high speed networks (refer to an *Introductory Survey* (pages 116 to 129)—GG24-3816-01 *ITSC Raleigh* June 1993). However, in most of the case, packets using different modes can share the same data transmission facilities. As illustrated by the following examples, each routing mode has its particular intended use and includes advantages and disadvantages that complement the other modes.

Point-to-Point Transmission
Source Routing

This routing mode is a particular implementation of the distributed routing for connectionless networks. The access node is responsible for calculating the route the packet must take through the network. Each packet includes in its routing field a list of the labels of all links through which the packet will pass as it moves across the network. Source Routing requires no connection set up activity in intermediate nodes and supports true datagram services.

Label Swapping

This routing mode is used in connection oriented networks. Each packet sent on the link has a header which includes an arbitrary number identifying which logical connection that this packet belongs to. Label Swapping requires that connection tables be set up and maintained dynamically in each node.

Multi-Points Transmission

Multicast allows one entity to communicate with multiple entities. The Multicast Tree Routing is supported by the ability of each node to recognize that a particular label represents a pre-defined tree and to forward the received packet along all the outbound links associated with that tree.

Network Control Functions

The Network Control Functions are those that control, allocate, and manage the resources of the physical network. Each Routing Point has a set of the foregoing functions in the Route Controller (305) and uses it to facilitate the establishment and the maintenance of the connections between users applications. The Network Control Functions include in particular: Directory Services for retrieving and maintaining information about network users and resources; Bandwidth Management for processing the bandwidth reservation and maintenance messages, and for monitoring the current reservation levels on links; Path Selection for choosing the best path for each new connection considering the connection requirements and the current link utilization levels; and Control Spanning Tree for establishing and maintaining a routing tree among the network nodes for using it to distribute control information (in parallel) including link utilization, and for updating nodes and their Topology Database with new network configurations or link/node failures. Topology Update for distributing and maintaining, in every node, information about the physical and logical network (including link utilization information) using the Control Spanning Tree; and Congestion Control for enforcing the bandwidth reservation agreements between the network's user and the network which are established at the call set up time, and for estimating actual bandwidth and for adjusting reservation if necessary during the life of the connection.

The Control Spanning Tree is the principal system used to disseminate control information such as Topology Database (306) updates. This mechanism is fundamental to minimize delays due to intermediate node processing: First, an intermediate node will get each control message exactly once on the tree. Second, the message can be forwarded along outgoing links of the tree before the intermediate node has even looked at the packet contents. A distributed algorithm creates and maintains the Control Spanning Tree in presence of node and link failures and helps to minimize the impact of the increased control flows that result when the network grows.

Bandwidth Management

An efficient bandwidth management is essential to take full advantage of a high speed network. While transmission costs per byte continue to drop year after year, transmission costs are likely to continue to represent the major expense of operating future telecommunication networks as the demand for bandwidth increases. Thus considerable effort has gone into designing congestion control, estimation, and path selection algorithms contributing to manage the network bandwidth.

The simplest way to provide low/no packet loss would be to reserve the entire bandwidth of the user connection. For bursty user traffic however, this approach can waste a significant amount of bandwidth across the network. The basic idea is to reserve a bandwidth amount equal to the "equivalent capacity" needed by the user, said equivalent capacity being a function of the source characteristics and of the network status. The reservation level fails somewhere between the average bandwidth required by the user and the maximum capacity of the connection.

Most of the high speed connections are established on a reserved path to guarantee the quality of service and the bandwidth requested by the user. This path across the network is computed by the originating node using information in its Topology Database including current link utilizations. The originating node then sends a reservation request along the chosen path, and intermediate nodes (if allowing the reservation) then add this additionally reserved capacity to their total. These changes are reflected in topology broadcast updates sent by the intermediate nodes. Intermediate nodes need not have an awareness of the status or each connection on their adjacent links. If an intermediate node does get too many packets, generally because of unanticipated burstiness, it simply discards them (the user can select a service that will recover from such discards).

Depending on the node type, the function of Bandwidth Management in the origin node, is to identify the best possible route according to the network status and the connection parameters including the connection priority, to reserve, at call set up, the bandwidth required by the network connections and to maintain this bandwidth for the duration of the connection; to reject the connection if resources needed to satisfy the request are not available in the network.

In a transit node, the Bandwidth Management function administers the bandwidth reservations on the links.

Topology Database

The Topology Database contains information about nodes, links, their properties, and bandwidth allocation. The topology information is replicated in each node of the network. A topology algorithm guarantees the correctness of each node's Topology Database as links and nodes are added, deleted, or change their characteristics. The database contains several types of information: the physical topology of the network which includes static information like physical characteristics of nodes and links; the state of the nodes and links; and the link utilization which includes the dynamic characteristics like current bandwidth (used and reserved), real time measurements.

Database Structure

Figure 5:
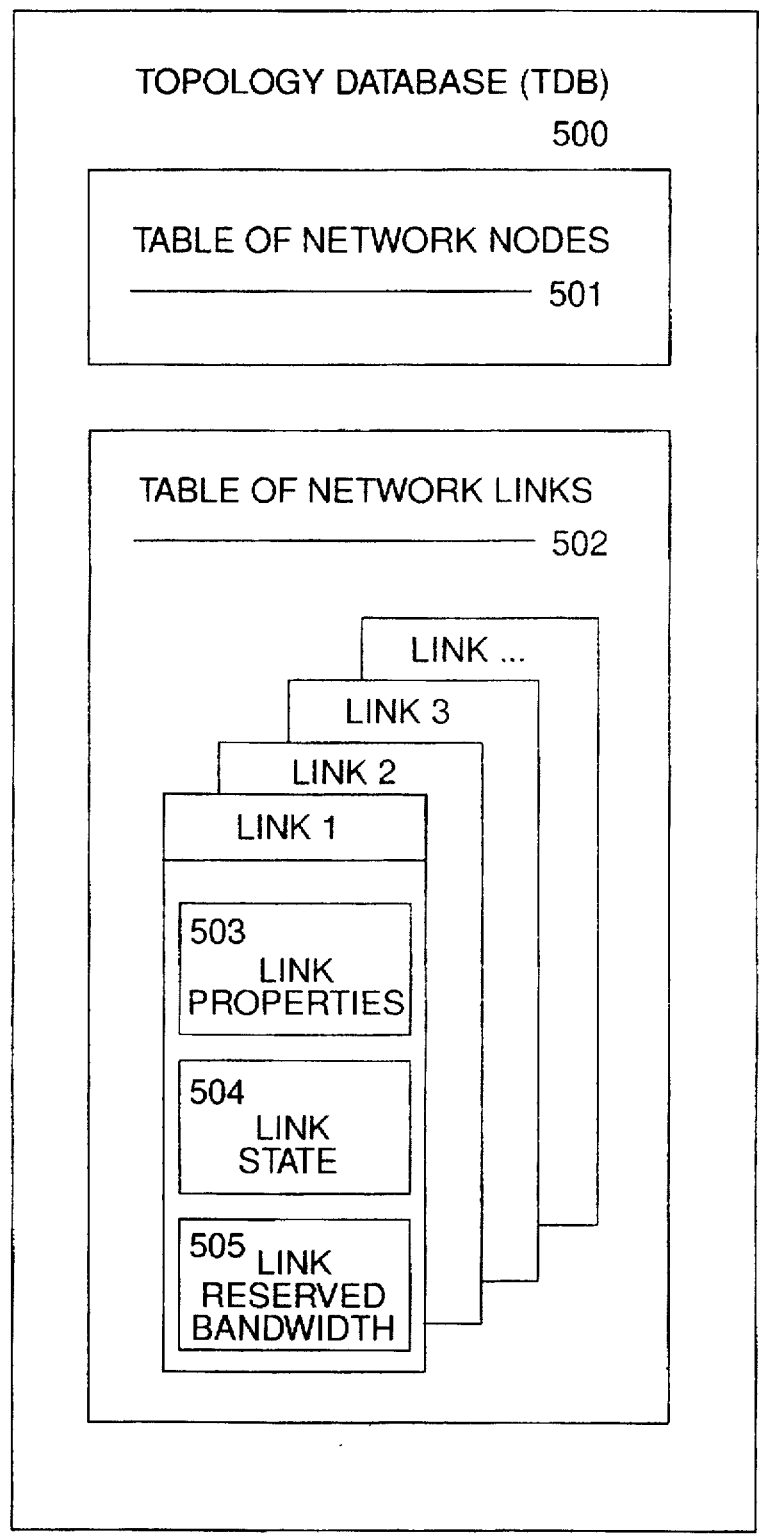
FIG. 5 describes the Topology Database general structure.

The general organization of the Topology Database is shown in FIG. 5. To each resource in the network, nodes (501) and links (502), is associated an entry in the database. Each link entry includes, in particular, the following characteristics:

(503) the link physical properties:
  transmission medium and speed
  routing modes supported
  maximum packet size
  link buffer capacity
  propagation delay
  link eligible for Control Spanning Tree, bandwidth reservation supported, etc.

(504) the link state:
  on-line (link can accept user connections)
  quiesce (link cannot accept additional user connections, but existing connections continue)
  off-link (link cannot accept user connections and existing connections are cancelled).

(505) the link utilization:
  real time measurements
  reserved bandwidth

Bandwidth Reservation Information

In common network architectures, the reserved bandwidth of a link (k,l) is defined for each connection priority level p and is represented by a link metric $L_{p,kl}$ defined by three variables:

$m_{p,kl}$: sum of the average bit rates of network connections on link (k,l) with priority p, $\sigma_{p,kl}^2$ sum of the variances of the bit rate of network connections on link (k,l) with priority p, $\hat{C}_{p,kl}$: reserved equivalent capacity for connections on link (k,l) with priority p.

In present invention, as it will be described later, the reserved bandwidth of links will be defined only for a limited number of priority groups, each group comprising a plurality of priority levels. The purpose is to save memory space and to create a very low traffic overload with update messages. However, nodes will maintain, in their Topology Database, the detailed reserved bandwidth distribution of their outgoing links per priority level.

Network Metrics

Connection Metric

The requested connection can be expressed with the following vector c:

R peak rate
m average bit rate
b average burst duration

The variance of the bit rate $\sigma^2$ and the utilization of the connection $\rho$ are computed from the network connection metrics at the beginning of the Path Selection process.

$$\rho = m/R$$

$$\sigma^2 = m(R-m)$$

Connection Equivalent Capacity

The actual bandwidth occupied by a connection on a link is modelled by the Connection Equivalent Capacity. Assume a connection 'i' with metric $(R_i, m_i, b_i)$ to be set up over a link operating at constant rate. A buffer is used at the link head in order to cope with the source bursts. The link capacity required to handle the connection with a desired buffer overflow $\epsilon$ is given by:

$$\hat{c}_i = R_i \frac{y - X + \sqrt{(y-X)^2 + 4X\rho_i y}}{2y}$$

where:

X is the amount of buffer space available $$y = \ln\frac{1}{\epsilon} \; b_i(1-\rho_i)R_i$$

Equivalent Capacity

Link (k,l) connects node k with node l and supports N multiplexed connection. The Equivalent Capacity $\hat{C}_{kl}$ associated with the aggregation of the N connections is defined as the capacity of the link (k,l) to ensure that the traffic is handle with a desired buffer overflow probability $\epsilon$ and a buffer size X.

Equivalent capacity of link (k,l):

$$\hat{C}_{kl} = \hat{C}_{kl}^{(N)} = \sum_{i=1}^{N} \hat{c}_{i,kl} = \text{sum of the connection equivalent capacities}$$

Link Metric

The metric of the link (k,l) reflecting the current utilization of said link, is defined as the vector:

$$L_{kl} = \{m_{kl}, \sigma_{kl}^2, \hat{C}_{kl}^{(N)}\}$$

where:

$$m_{kl} = \sum_{i=1}^{N} m_i$$

is the total mean bit rate, and $$\sigma_{kl}^2 = \sum_{i=1}^{N} \sigma_i^2 = \sum_{i=1}^{N} m_i(R_i - m_i)$$

is the sum of the variances of the connections on the link (k,l).

Reservable Link Capacity

If $C_{kl}$ is the total capacity of link (k,l) then $R_{kl} = rf \times C_{kl}$ is the reservable capacity of this link (k,l).rf is the reservable fraction of the link capacity. It allows to let some link bandwidth always available (non reserved) to flow the network control traffic ($\hat{C}_{kl} \leq R_{kl} \leq C_{kl}$). For most network architectures, no more than 85% of a link's total bandwidth $C_{kl}$ can ever be explicitly reserved for user traffic (rf<0.85).

Path Selection

The purpose of the Path Selection process is to determine the best way to allocate network resources to connections both to guarantee that user quality of service requirements are satisfied and also to optimize the overall throughput of the network. The Path Selection process must supply to the requesting user a path over which a point-to-point connection will be established, and some bandwidth will be reserved if needed. The Path Selection algorithm uses as input parameters on one side the user requirements and on the other side the status of the network links and nodes as maintained in the Topology Database.

The Path Selection function selects the "best" path based on the following criteria, listed in the order of importance:

a. Quality Of Service: The connection's Quality Of service requirements are to be satisfied throughout the life of the connection.

b. Minimum Hop: The path shall consist of as few links as feasible to support the connection's Quality Of Service requirements, thus minimizing the amount of network resources as well as processing costs to support the connection.

c. Load Balancing: Among minimum hop paths, a path with "lightly loaded" links is preferred over a path with "more heavily loaded" links based on the network conditions at the time of path selection.

Quality Of Service Requirement

There are a large number of variables that determine the performance of a network. However, the quality of service can be defined as the set of measurable quantities that describe the user's perception of the service offered by the network. Some Quality Of Service parameters might have an effect upon how path are computed, for example:

the Packet Loss Probability

The traffic loss probability of a connection is guaranteed to be less than the minimum allowable value if at each link (k,l) used in the connection. The amount of reserved bandwidth $\hat{C}_{k,l}^{(2)}$ is always kept from exceeding the link's reservable capacity $R_{k,l}$. This is achieved by considering only those links (k,l) for which $\hat{C}_{k,l}^{(2)} < R_{k,l}$ during path selection.

the End-to-end Transit Delay

Factors that influence this parameter, in addition to network load conditions are the link propagation delay (constant delay) and the intermediate node transmission delay (variable delay).

The effect of some of these parameters upon path computation might be in the form of additional constraints. For example, the sum of propagation delays along a computed path may not violate the End-to-end Transit Delay specification. In any case, both the set of Quality Of Service parameters and the network connection characteristics specified influence the path computation.

Minimum-Hop Requirement

The Path Selection function finds a path with, as few links as possible that supports the Quality of Service requirements of each of the requested connection. This minimizes the amount of network resources used and the cost to support the connections. The path computation is based on the links reservation levels at the time the connection is requested. This path may not have the "absolute minimum" number of hops (the number of links in a minimum hop path that satisfies the Quality Of Service requirements assuming that the requesting connection is the only one using the network). If a path with this absolute minimum number of hops cannot be found a longer path has to be used. A path having an absolute minimum hop count is called a principal path, and its links are called principal links. A path having more hops than the absolute minimum hop count is called an auxiliary path and its links may be principal or auxiliary.

The Path Selection process considers that a principal link can be utilized up to its reservable capacity $R_{k,l}$ but that an auxiliary link can be utilized only up to a $\times R_{k,l}$ where a is generally equal to 0.9, the purpose being to favor the principal links in order to optimize the global utilization of the network resources. In the auxiliary links, the remaining fraction of the reservable capacity is set aside for future connections with respect to which these links are principal.

Load Balancing Requirement

A Load Balancing Weight $w_{k,l}$, which is an increasing function of the amount of bandwidth reserved on the link, is assigned to each link. During Path Selection, if more than one minimum hop path satisfying the Quality Of Service constraints, the one with the smallest path weight (i.e., the sum of the links weights over the path) is chosen. The weight of a link is given by:

$$w_{k,l} = \frac{C_{k,l}}{(C_{k,l} - \hat{C}_{k,l}^{(1)})(C_{k,l} - \hat{C}_{k,l}^{(2)})}$$

where:

$C_{k,l}$ is the total capacity of the link $\hat{C}_{k,l}^{(1)}$ is the capacity reserved on the link before the new connection $\hat{C}_{k,l}^{(2)}$ is the capacity reserved on the link including the new connection The more the links are congested, higher the weights are.

Additional Requirements

Additional requirements are considered during the selection of the best point-to-point path, in particular:

delay priority on the connection (real time, non-real time), connection priority, state of the links on the path, routing modes supported by links Path Selection The Path Selection function is executed during the second phase of the Call Set Up process which will be described later. The inputs of the path computation are the connection parameters and the connection priority level p. The output is a path with the required Quality Of Service or the rejection of the connection. The function comprises the following steps:

Path Determination: The origin and destination information is used in conjunction with the Directory Services and the Topology Database to determine all the possible paths for connection "i".

Connection Request Vector Computation: A request vector $r_{i,k,l}$ for the connection "i" is computed using the connection metric $c=(R_i,m_i,b_i)$ and the requested equivalent capacity $\hat{c}_{i,k,l}$ of each link (k,l) with different buffer size X and loss probability requirements $\epsilon$.

$$r_{i,k,l}=(m_i, \sigma_i^2, \hat{c}_{i,k,l})$$

Equivalent Link Capacity Computation: Equivalent Capacity of link (k,l)

$$\hat{C}_{k,l}^{(2)} = \sum_{j=p}^{P_{max}} \hat{C}_{j,k,l}^{(2)}$$

with:

p=requesting priority level of the requesting connection "i", $P_{max}$=highest priority level on the link.

If the requesting equivalent capacity $\hat{c}_{k,l} \leq R_{k,l} - \hat{C}_{k,l}^{(2)}$ the link (k,l) can be accepted, and if the requesting equivalent capacity $\hat{c}_{k,l} > R_{k,l} - \hat{C}_{k,l}^{(2)}$ the link (k,l) is rejected, with $R_{k,l}$ equal to the reservable capacity on link (k,l).

Link Metrics Updating: The metric of each link in each potential path is updated according to the new connection $$L_{p,k,l}=\{m_{p,k,l},\sigma_{p,k,l}^2, \hat{C}_{p,k,l}^{(2)}\}$$

Link weight: For each link, the new and old capacities are used to compute the link weight: $w_{k,l}$.

Principal links: Principal and auxiliary links are computed.

Shortest path: the shortest path satisfying the Quality Of Service requirements with the minimum hop count $h_{min}$ is selected by means of a routing algorithm derived from the Bellman-Ford algorithm.

Load balancing: the shortest path with the smallest path weight is finally chosen.

Connection Set Up

Figure 1:
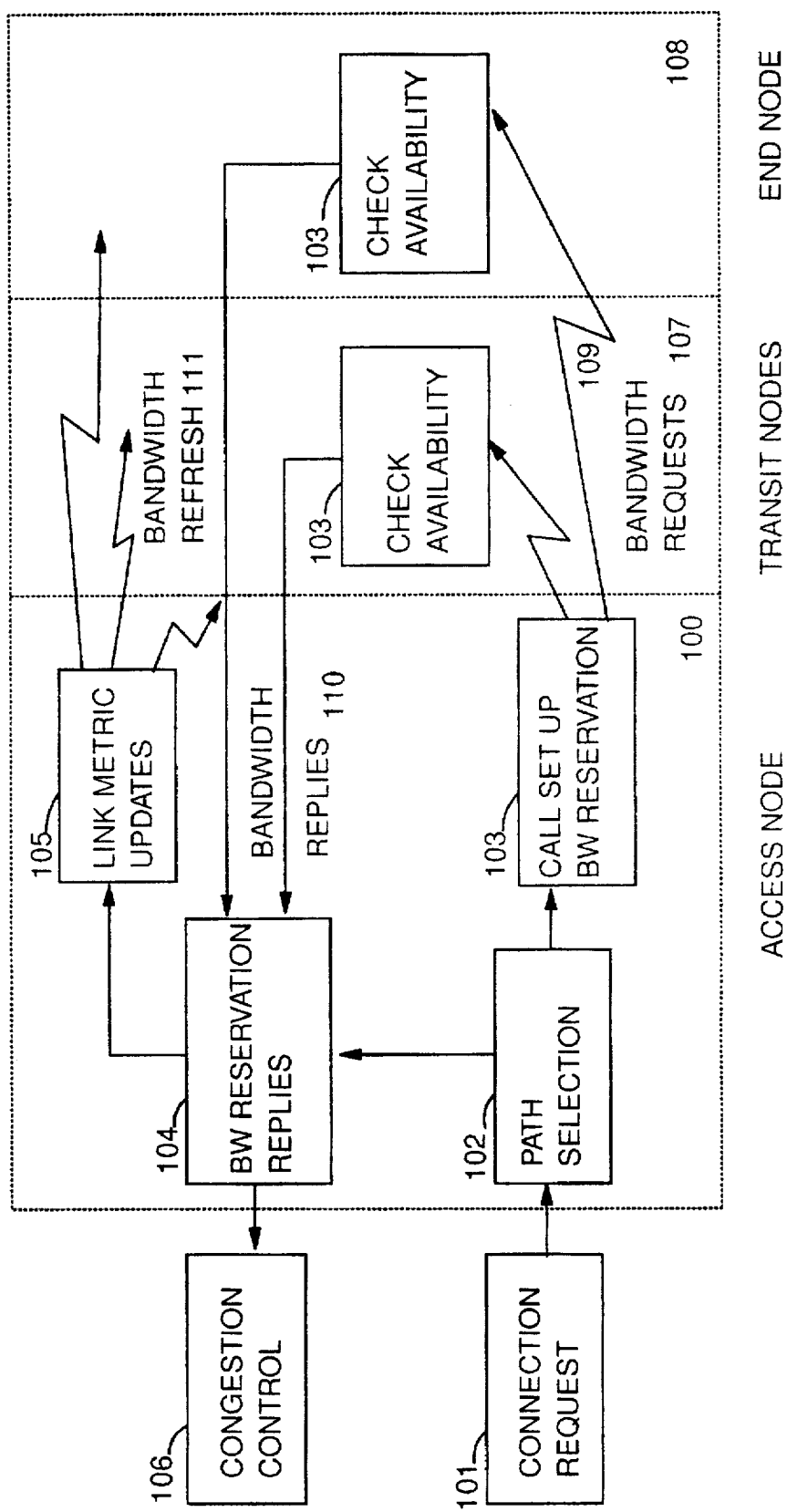
FIG. 1 describes the call set up and the bandwidth reservation process according to the present invention.

A connection is defined as a path in the network between the origin access node and the destination access node representing respectively the source user and the target user. The connection set up and bandwidth reservation process, as shown in FIG. 1, comprises the following steps:

(101) a Connection Request is specified by the user via a set of parameters including origin and destination network address, and data flow characteristics (bit rate, burstiness).

(102) a Path Selection process determines a path and a set of connection requests, one for each link of the path, using parameters provided by the Topology Database.

(103) a Bandwidth Reservation process uses the connection requests to reserve bandwidth on each of the links of the path. This process involves exchange of information (109) between the origin (access) node (100), the transit nodes (107) on the path, and the destination node (108).

(104) Bandwidth Reservation Replies from transit nodes and end node generate either a call acceptance or a call reject (110).

(105) a Link Metric Update process updates, in case of call acceptance, the modified link metrics. This information (111) is sent through the Control Spanning Tree to the Topology Database of each node in the network by means of a broadcast algorithm.

(106) a Congestion Control Set Up adjusts, if the call is accepted, the network connection characteristics.

Network Connection Preemption
Bandwidth Reservation

At the connection set up, two paths, one for each direction, are computed and described by a source routing chain. Before sending data packets along said paths, transmission capacity must be reserved. The reservations for transmission from the origin to the destination are called the forward bandwidth reservations, and the reservations for transmission from the destination to the origin are called the backward bandwidth reservation.

The origin node (100) sends a Bandwidth Request message (109) (i, $ĉ_{f,k,i}$, $ĉ_{b,k,i}$) (with the source routing chain previously computed) to each of the transit nodes (107) along the chosen path, where i is the identifier of the network connection, and $ĉ_{f,k,i}$ and $ĉ_{b,k,i}$ represent respectively the forward and backward requested connection equivalent bandwidth capacity.

Upon receiving a Bandwidth Request message, a transit node determines (103) if there is sufficient capacity to satisfy the request. Each transit node responds to the origin node with a Bandwidth Reply message (110) (i,$link_f$,$link_b$, $ĉ_f$, $ĉ_{b,k,i}$) where i is the network connection identifier, $link_f$ is the forward outgoing link identifier, $link_b$ is the backward outgoing link identifier, $ĉ_{f,k,i}$ is the capacity granted in the forward direction, and $ĉ_{b,k,i}$ is the capacity granted in the backward direction. If an intermediate node cannot accommodate the requested capacity in either direction, it set $ĉ_{f,k,i}$ (resp. $ĉ_{b,k,i}$) of its Bandwidth Reply to zero.

When the origin node collects a non-zero Bandwidth Reply for each link along the intended route and from the destination node, the reservation is deemed successful. It then immediately sends a Bandwidth Refresh message (111) (i, $ĉ_{f,k,i}$) to each transit node (107) and to the destination node (108) to let them know that all parties have agreed to the reservation and that the end points do indeed intend to use forward capacity $ĉ_{f,k,i}$. It also sends a Path Enabled message to the destination node indicating that all parties have agreed to the backward reservation for the capacity $ĉ_{b,k,i}$. The destination node responds by sending a Bandwidth Refresh message (i, $ĉ_{b,k,i}$) to each transit node and to the origin node along the reverse path. If the origin node receives a zero Bandwidth Reply from any transit node or from the destination node, the reservation fails.

Connection Priorities

Connection priorities are used by the Path Selection process to determine the feasibility of a potential route for a new network connection. A link is ineligible if the requested bandwidth is already held reserved for higher priority established connections. On the other side, some existing connections using this link may be preempted (terminated) in order to allow the new connection to be established on the link if this new connection has a higher priority.

Each network connection is assigned two priority attributes:

a Requesting Priority $p_r$ used by a new connection for preempting existing connections (with lower priority) when necessary, and a Holding Priority $p_h$ used by an existing connection to defend its position on a link against new connections wishing to use the same link.

A priority attribute is, in general, a natural number greater than or equal to zero, zero being the lowest priority. Established network connections defend their reservations with their Holding Priority. The preemption can occur if the Requesting Priority of the new connection is higher than the Holding Priority of the existing connection(s). In other words, a request with Requesting Priority x will preempt network connections with Holding Priority y only when x is greater than y. The Holding Priority of a connection is generally higher than its Requesting Priority for stabilization purpose ($p_h > p_r$).

Using the priority information stored in the Topology Database, the Path Selection process searches a feasible path while preempting only lower priority connections. During the call set up, when a preemption must be initiated, the transit node triggers a process that causes the sources of low priority connections to release their bandwidth reservations. Since each transit node keeps complete information about each connection (incl. connection priority), a transit node may initiate a preemption of a connection by sending an explicit preemption request to a source access nodes.

Network connections that are preempted will typically attempt to reestablish themselves on a new route that avoids the busy link(s) that caused them to be preempted.

Requesting Priority: The number of priority level depends on the network architecture and the type and diversity of traffic transmitted. As illustrated, suppose that the network architecture supports 65 possible levels of Requesting Priority for a connection ($0 \leq p_r \leq 64$). A zero value means no preemption is possible.

Holding priority: We will suppose, also, that the network architecture supports 65 possible levels of Holding Priority for a connection ($0 \leq p_h \leq 64$) with 64 being unpreemptible priority.

The Topology Database tracks for each link the reserved, held bandwidth (capacity) corresponding to the different connection preemption priorities.

Priority Groups: To avoid excessive storage space in the Topology Database and control message overhead, priorities are handled within a limited number of groups. In an architecture with, for example, 65 connection priority levels, it is possible to implement only four groups. The bandwidth used by all connections on a given network link is arranged in these preemption priority groups in order not to store in each node of the network all bandwidth information for each of the 65 priorities. Group 0 (g=0) contains the link bandwidth used by connections with the lowest priorities $0 \leq p < 16$. Group 1 (g=1) contains the link bandwidth used by connections with priorities $16 \leq p < 32$. Group 2 (g=2) contains the link bandwidth used by connections with priorities $32 \leq p < 48$ Group 3 (g=3) contains the link bandwidth used by connections with the highest priorities $48 \leq p < 64$.

When a new network connection must be established, a set of links to build a path for the connection must be selected through the network. If not enough bandwidth is available on the links that would be needed due to excessive traffic conditions, the Path Selection function considers the requesting priority $p_r$ of the new connection in order to see if it has enough priority to preempt some already existing connections on the given link(s). As the information, in the Topology Database, on links bandwidth is available only for each of the 4 global priority groups (0 to 3), only the bandwidth used by connections belonging to groups of a lower holding priority $p_h$ than the new connection can be considered as preemptible.

For example, a new network connection with requesting priority $p_r=37$ (priority group g=2) can only preempt existing connections belonging to holding preemption priority groups 0 and 1. The bandwidth occupied by network connections with holding priorities $0 \leq p_h < 32$ will just be considered as free bandwidth.

Figure 4:
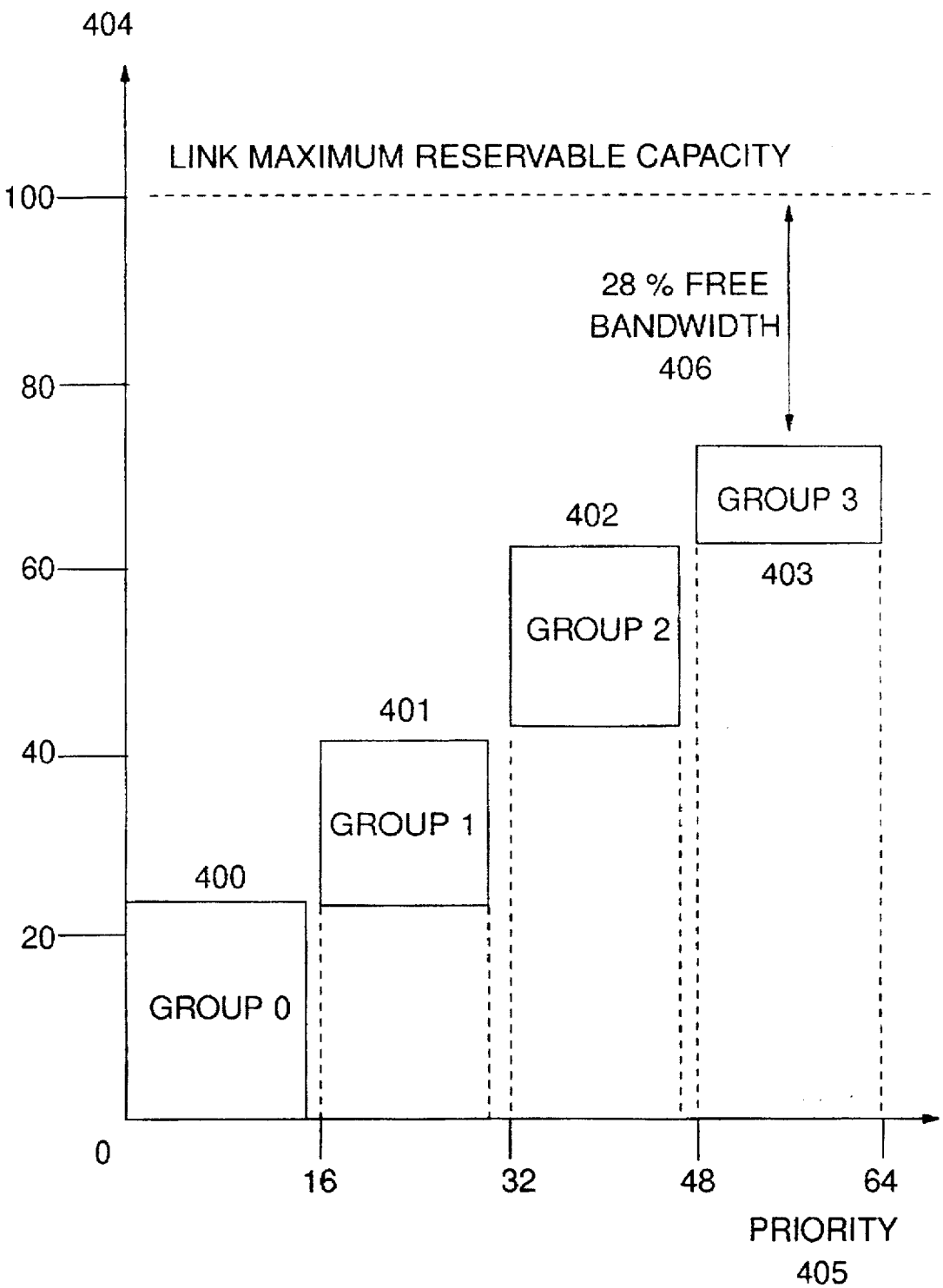
FIG. 4 shows link bandwidth distribution on priority groups according to the prior art.

An illustration of bandwidth reservation (404) on a link by several connections of different priorities (405) is shown in FIG. 4:

a. 24% of bandwidth is reserved by connections of group 0 (400);

b. 16% of bandwidth is reserved by connections of group 1 (401);

c. 24% of bandwidth is reserved by connections of group 2 (402);

d. 8% of bandwidth is reserved by connections of group 3 (403); and e. 28% of link reservable bandwidth is free (406)

The exact distribution of connections priorities inside each of the four groups is only known by the transit node and is not replicated in each node of the network (not to overload the network with Topology Database update messages). In particular, the origin node contains only the bandwidth distribution of priority groups. The general format of the link information stored in the Topology Database is shown in FIG. 5. This information comprises: the link physical properties; the link state; and the bandwidth reserved on the links for each priority group. The bandwidth reserved is regularly updated by means of Topology Database update messages exchanged on the Control Spanning Tree.

Dynamic Median Priority

The origin node will not have the knowledge of the bandwidth used by the network connections for each connection priority but only for each priority group. In our example, with 65 priority levels arranged in 4 priority groups, the network Path Selection mechanism may be imprecise or may even fail in finding a route in the network though a route would actually be feasible. This problem is likely to occur especially when the network is highly loaded. If no further information is available on the distribution of the priorities within a given priority group, only the bandwidth of inferior preemption groups can be considered as potentially available. The knowledge of a Dynamic Median Priority (DMP) in each preemption group, may allow the establishment of a new connection by considering the preemption of connections of its group during the path selection operation.

Dynamic Median Priority Definition

A further feature of the present invention consists in establishing connections even if not enough bandwidth exists in groups with lower holding priorities or when new connections belong to group 0, by preempting, in some situations, connections in their own group. From the cumulated bandwidth information associated to each priority group stored in the Topology Database, there is computed a Dynamic Median Priority value (DMP) defined as the priority value that divides the used bandwidth of the group in two equal parts. The Dynamic Median Priority allows a much better knowledge of the bandwidth utilization per group on a link while consuming very little memory space and generating very low traffic overload. It allows a determination of whether a path is available or not for a new connection with much more precision and efficiency and reduces the number of connections rejected by the Path Selection during the Call Set Up.

Figure 6:
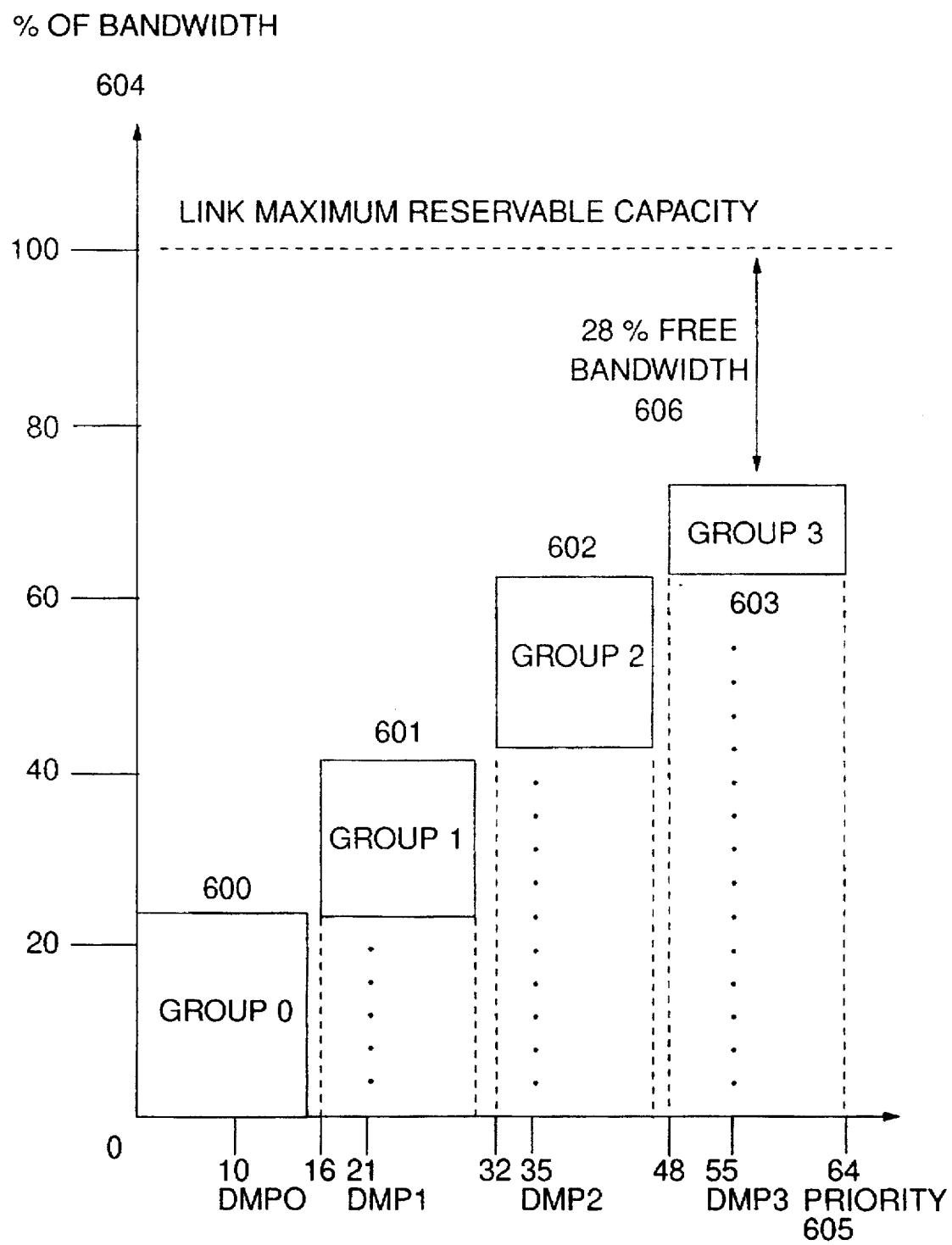
FIG. 6 shows the use of the Dynamic Median Priority according to the present invention.

If, for example, a new connection has the priority $p_r=37$ (priority group g=2) and the DMP value of group 2 is 35, then this new connection may preempt existing connections of its group, even if the average priority of group 2 is 40. The function evaluating the available bandwidth can now consider that at least half of the bandwidth used by group 2 connections can be preempted by the new connection. More bandwidth is now available. This scenario is illustrated in FIG. 6. Bandwidth available to a connection with priority $p_r=37$ is: +28% (free bandwidth); +24% (group 0 bandwidth); +16% (group 1 bandwidth); +12% (half of group 2 bandwidth); for a total of 80% of link reservable bandwidth At least half of group 2 bandwidth is preemptible as the connection requesting priority $p_r=37$ is higher than group 2 median $p_h=35$ In order to be implemented in the network architecture, the Dynamic Median Priority must be added to the bandwidth reservation information related to the priority groups of each link and stored in the Topology Database accessed by the Path Selection process.

The present invention enables a more efficient handling of preemption priorities in the network, leading to less unsuccessful connection set up and better overall behavior of network, especially under high load conditions.

Dynamic Median Priority Computation

In transit nodes, the Bandwidth Management function is responsible of the links bandwidth reservation and utilization and of the duplication of this information in the Topology Database of each network node by means of update messages. As previously described, a link bandwidth reservation information is defined for each of the four preemption groups. Each preemption group for a specific link (k,l) is described by at least two variables: the reserved bandwidth of existing connections in the group ($\hat{C}_{g,kl}$); and the Dynamic Median Priority ($DMP_{g,kl}$) value which must be considered as a very useful indicator on the bandwidth distribution of the connections inside the group.

Figure 8:
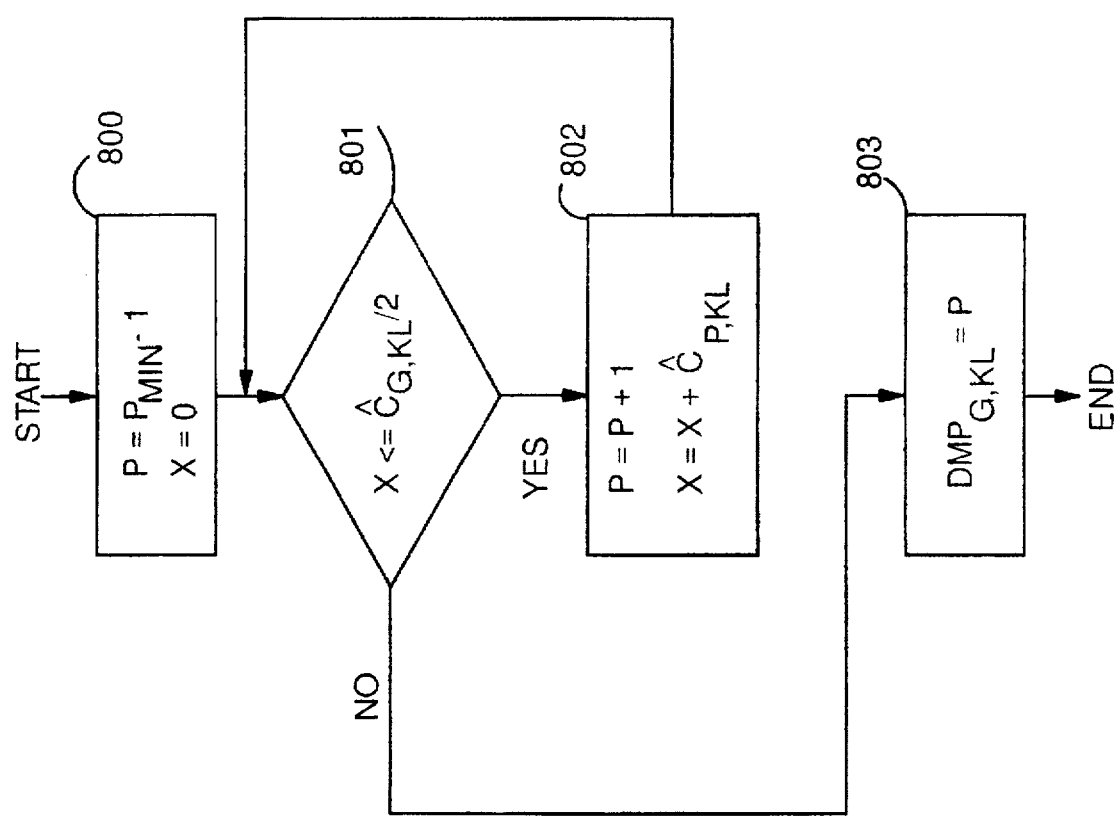
FIG. 8 details the Dynamic Median Bandwidth computation according to the present invention.

In fact the Dynamic Median Priority is formally defined as the minimum priority corresponding at least to the half of the reserved bandwidth inside a priority group. It is clear that each time a change on the bandwidth reservation of a preemption group occurs (due to connection set up, disconnection, bandwidth reservation change for a connection), the resulting process involved is a new computation of the cumulated bandwidth reservation (very simple) but also a new computation of the Dynamic Median Priority value. The algorithm to determine the Dynamic Median Priority is quite simple and is illustrated in FIG. 8: inside the group corresponding to the Dynamic Median Priority under computation, the process must sum the reserved bandwidth of each priority level from the lowest one up to just exceed the total reserved bandwidth divided by two. The Dynamic Median Priority is then the last priority used in the process loop.

Pseudo code:

$p=p_{min}-1$ (800) (initialization of the variable p meaning 'priority level' to the lowest priority level $p_{min}$, inside priority group g, minus one priority level)

x=0 (800) (initialization to zero of the variable x meaning 'cumulated reserved bandwidth')

While $x \leq a\hat{C}_{g,kl}$ (801) ($\hat{C}_{g,kl}$: Total reserved bandwidth in the priority group g and a=½)

Do p=p+1 (802) (increment by one priority level variable p)

Do $x=x+\hat{C}_{p,kl}$ (802) (add the bandwidth reserved for priority p ($\hat{C}_{p,kl}$) to the current value taken by the variable x and put the result inside variable x)

Done $DMP_{g,kl}$=p (803) (p: variable containing the resulting priority at the exit of the loop when the 'While' test above is false)

Dynamic Median Priority in Path Selection

When the Path Selection process assesses that it is unable to find a feasible path without disconnecting a certain number of preemptible connections (with lower priority level), it enables the following preemption mechanism. If the requesting priority of the connection (p,eg) is lower or equal to the Dynamic Median Priority ($DMP_{g,kl}$) of its group (g); only the reserved bandwidth of the lower groups may be preemptible. If the priority of the connection (p,eg) is higher than the Dynamic Median Priority ($DMP_{g,kl}$) of its group (g), half the reserved bandwidth in this group g $$g\left(\frac{\hat{C}_{g,kl}}{2}\right)$$

may be added to the reserved bandwidth of the lower groups to compute the aggregate preemptible reserved bandwidth. This means that the step of computing the Equivalent Link Capacity previously described in the Path Selection process can be now written as follows:

If $p_r \leq DMP_{g,kl}$ ($p_r\epsilon g$) then the reserved Equivalent Capacity of link (k,l) is equal to:

$$\hat{C}_{kl}^{(2)} = \sum_{j=g}^{G_{max}} \hat{C}_{j,kl}^{(2)}$$

with:

g=priority group of the requesting connection,
$G_{max}$=highest priority group on the link.

If $p_r > DMP_{g,kl}$ ($p_r\epsilon g$) then the reserved Equivalent Capacity of link (k,l) is equal to:

$$\hat{C}_{kl}^{(2)} = \frac{\hat{C}_{g,kl}^{(2)}}{2} + \sum_{j=g+1}^{G_{max}} \hat{C}_{j,kl}^{(2)}$$

with:

g=priority group of the requesting connection,
$G_{max}$=highest priority group on the link.

The preemption can be determined be means of the following considerations: If the requesting equivalent capacity $\hat{c}_{kl} \leq R_{kl} - \hat{C}_{kl}^{(2)}$, the link (k,l) is eligible; and, if the requesting equivalent capacity $\hat{c}_{kl} > R_{kl} - \hat{C}_{kl}^{(2)}$ the link (k,l) is rejected, with $R_{kl}$ equal to the reservable capacity of link (k,l).

Dynamic Median Priority in Topology Database

As illustrated in FIG. 7, for each link (kl), a reserved equivalent capacity $\hat{C}_{g,kl}$, a sum of the average bit rate of the connections $m_{g,kl}$, a sum of the variance of the connections $\sigma_{g,kl}^2$ and a Dynamic Median Priority $DMP_{g,kl}$ are defined for each priority group. The Dynamic Median Priority is broadcasted to all network nodes and stored in the Topology Database.

Accuracy Improvement

By using the same preemption calculation and with minor additional process, the priority granularity within each priority group can be improved by means of new parameters called Dynamic Intermediate Priority levels (DIP) corresponding to predefined portions "a" of reserved bandwidth ($a\hat{C}_{g,kl}$ with 0<a<1). For example, it can be defined, in addition to the Dynamic Median Priority previously described: a) a Dynamic Quarter Priority ($DIP^{1/4}$): Priority Value that divides the reserved bandwidth of a priority group in 25% and 75%; and b) a Dynamic Three Quarter Priority ($DIP^{3/4}$) Priority Value that divides the reserved bandwidth of a priority group in 75% and 25%.

The process of computing Dynamic Intermediate Priority levels is similar to the one described in FIG. 8 (the ratio "a" for the Dynamic Median Priority level is equal to ½). Dynamic Intermediate Priority levels are stored and updated in the Topology Database of each node in the network.

The Path Selection Process is modified as follows. If the requesting priority of the connection (p,eg) is lower or equal to the Dynamic Quarter Priority ($DIP_{g,kl}^{1/4}$) of its group (g), only the reserved bandwidth of the lower groups may be preemptible. If the priority of the connection ($p_r\epsilon g$) is higher than the Dynamic Quarter Priority ($DIP_{g,kl}^{1/4}$) but lower than the Dynamic Median Priority ($DMP_{g,kl}=DIP_{g,kl}^{1/2}$) of its group (g).

A quarter of the reserved bandwidth in this group $$g\left(\frac{\hat{C}_{g,kl}}{4}\right)$$

may be added to the reserved bandwidth of the lower groups to compute the aggregate preemptible reserved bandwidth. If the priority of the connection ($p_r\epsilon g$) is higher than the Dynamic Median Priority ($DIP_{g,kl}^{1/2}$) but lower than the Dynamic Three Quarter Priority ($DIP_{g,kl}^{3/4}$) of its group (g); half of the reserved bandwidth in this group $$g\left(\frac{\hat{C}_{g,kl}}{2}\right)$$

may be added to the reserved bandwidth of the lower groups to compute the aggregate preemptible reserved bandwidth.

If the priority of the connection ($p_r\epsilon g$) is higher than the Dynamic Three Quarter Priority ($DIP_{g,kl}^{3/4}$): of its group (g); three quarter of the reserved bandwidth in this group $$g\left(\frac{3}{4}\hat{C}_{g,kl}\right)$$

may be added to the reserved bandwidth of the lower groups to compute the aggregate preemptible reserved bandwidth.

In most cases, the improvement of the preemption accuracy in Path Selection is not the main problem for designing a high speed network node. The memory occupation of the Topology Database is of more concern. The object of the present invention is to reduce the number of preemption groups stored in the Topology Database (memory saving) while keeping an approximately equivalent accuracy of the preemption thanks to the use in each group of the Dynamic Median Priority.

EXAMPLES

Two examples are detailed to show the contribution of the Dynamic Median Priority in the priority groups in the creation of an efficient connection preemption method.

19

Example I

Link T1 (1.3 Mbs reservable bandwidth)

In this first example all the allocated bandwidth has been done on the lowest priority group called Group 0 (this group comprises the 16 lowest priorities).

The distribution is:

| | |
|---|---|
| 100 Kbs | allocated to connections having priority 1 |
| 600 Kbs | allocated to connections having priority 3 |
| 300 Kbs | allocated to connections having priority 4 |
| 200 Kbs | allocated to connections having priority 12 |
| 1.2 Mbs | Total |

Dynamic Mediam Priority (DMP): priority 3 (100 kbs+600 kbs>1.2 Mbs/2)

The reservable bandwidth for the T1 link is 1.3 Mb/s, thus the remaining bandwidth is just 100 kb/s. So if a new connection requests more than 100 kb/s, a preemption process is mandatory to set up this connection.

Four priority groups approach: Having no preemption capability on the lowest priority connections within its group, a connection belonging to priority group 0 and which requests more than 100 kb/s will not be served in our example whatever its priority between 0 and 15.

Dynamic Median Priority (DMP) approach: The Dynamic Median Priority (DMP) being the priority 3, the new connection will be served in the following cases: new connection priority≦DMP and less than 100 kb/s requested; and new connection priority>DMP and less than 700 kb/s requested.

Example 2

Link E3 (29 Mbs reservable bandwidth)

Figure 9:
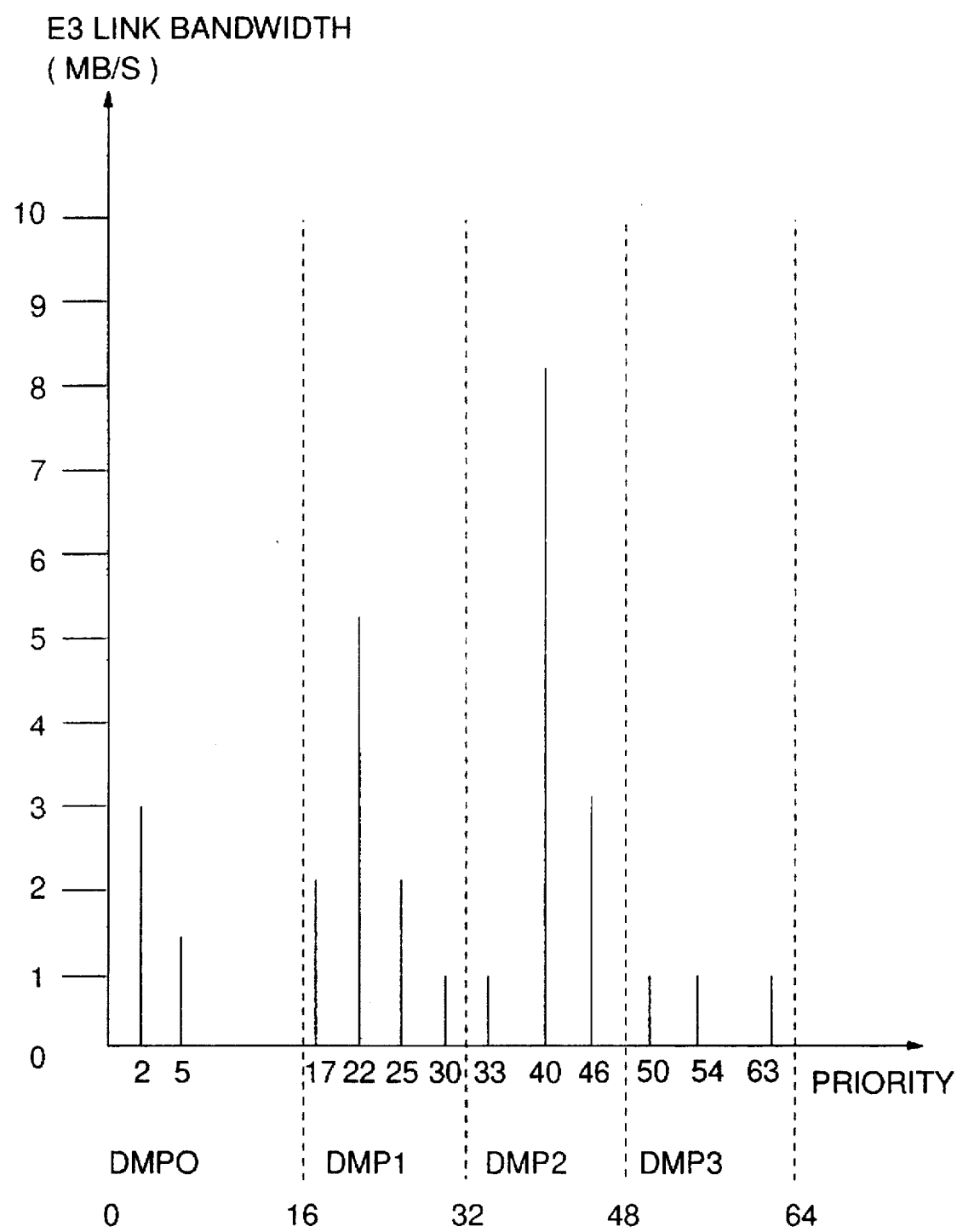
FIG. 9 shows the bandwidth distribution on a link per priority level according to example 2.

In this second example, illustrated in FIG. 9, all the allocated bandwidth is spread over the four priority groups with the following distribution:

Allocated bandwidth in Group 0 (connections with priorities between 0 and 15)

| | |
|---|---|
| 3 Mbs | allocated to connections having priority 2 |
| 1 Mbs | allocated to connections having priority 5 |
| 4 Mbs | Total |

Dynamic Median Priority (DMP0) for group 0: priority 2

Allocated bandwidth in Group 1 (connections with priorities between 16 and 31)

| | |
|---|---|
| 2 Mbs | allocated to connections having priority 17 |
| 5 Mbs | allocated to connections having priority 22 |
| 2 Mbs | allocated to connections having priority 25 |
| 1 Mbs | allocated to connections having priority 30 |
| 10 Mbs | Total |

Dynamic Median Priority (DMP1) for group 1: priority

Allocated bandwidth in Group 2 (connections with priorities between 32 and 47)

20

| | |
|---|---|
| 1 Mbs | allocated to connections having priority 33 |
| 8 Mbs | allocated to connections having priority 40 |
| 3 Mbs | allocated to connections having priority 46 |
| 12 Mbs | Total |

Dynamic Median Priority (DMP2) for group 2: priority 40

Allocated Bandwidth in Group 3 (connections with priorities between 48 and 64)

| | |
|---|---|
| 1 Mbs | allocated to connections having priority 50 |
| 1 Mbs | allocated to connections having priority 54 |
| 1 Mbs | allocated to connections having priority 63 |
| 3 Mbs | Total |

Dynamic Median Priority (DMP3) for group 3: priority 54

In this example, all the reservable bandwidth on the link is already allocated. A new connection set up implies that the preemption process releases the required bandwidth.

Priority Groups

With the 4 priority groups approach, the requirements for a new connection set up are:

If the new connection belongs to group 0: the connection set up is rejected whatever the requested bandwidth.

If the new connection belongs to group 1: Requested bandwidth<4 Mbs.

If the new connection belongs to group 2: Requested bandwidth<14 Mbs.

If the new connection belongs to group 3: Requested bandwidth<26 Mbs.

Dynamic Median Priority

With the Dynamic Median Priority (DMP) approach, the requirements for a new connection set up are:

If the new connection belongs to group 0: New connection priority>2 and requested bandwidth≦2 Mbs If the new connection belongs to group 1: New connection priority≦22 and requested bandwidth≦4 Mbs
New connection priority>22 and requested bandwidth≦10 Mbs If the new connection belongs to group 2: New connection priority≦40 and requested bandwidth≦14 Mbs
New connection priority>40 and requested bandwidth≦20 Mbs If the new connection belongs to group 3: New connection priority≦54 and requested bandwidth≦26 Mbs
New connection priority>54 and requested bandwidth≦27.5 Mbs In all cases, the requirements to set up the new connection are less constraining with the Dynamic Median Priority approach. It proves its superior capability to evaluate the preemptible connections and to supply an optimal network path.

We claim:

1. For use in a multi-priority packet switching network having a plurality of nodes interconnected with links carrying multiple traffic connections wherein existing connections are each assigned a priority level and said priority levels are assigned to groups of consecutive priority levels, a method for determining whether to establish a connection on a given path through the network from an originating node to a destination node through at least one intermediate node, the given path being proposed in response to a requested connection, said method comprising the steps of:

at each intermediate node in the network, for each group on each outgoing link from said intermediate node having at least two existing connections, assigning the priority levels of the existing connections in said group to one of two or more subgroups and communicating the subgroup definitions to other nodes in the network;

at the originating node, for each link on the given path, determining whether the bandwidth requirements for a requested connection can be satisfied, in sequence, from free bandwidth, from bandwidth already allocated for existing connections having priority levels assigned to lower priority groups than the group including the priority level of the requested connection, and where the subgroup including the priority level of the requested connection is not the lowest subgroup in its group as determined by subgroup definitions communicated from an intermediate node, from bandwidth already allocated to existing connections having priority levels assigned to lower subgroups in its group; and where bandwidth requirements can be satisfied in accordance with the preceding step for every link on the given path, preempting existing connections as necessary to reassign bandwidth to the requested connection, otherwise rejecting the requested connection.

2. A method as defined in claim 1 wherein the subgroups for each group are dynamically defined by periodically allocating a predetermined percentage of the bandwidth currently used for existing connections in the group to one of the subgroups, the boundary between adjacent subgroups being defined as a particular priority level.

3. A method as defined in claim 2 wherein two subgroups are defined for each group and each of said subgroups contains substantially half of the currently allocated group bandwidth.

4. A method as set forth in claim 2 or claim 3 wherein the step of determining the priority level at the boundary between the two subgroups comprises the further steps of:

selecting a priority level in the group beginning with the lowest priority level;

establishing a cumulative bandwidth variable equal to the sum of the bandwidths currently allocated to each selected priority level; and if the ratio of the cumulative bandwidth variable to the group bandwidth is at least equal the predetermined ratio, identifying the last selected priority level as the boundary between the two subgroups, otherwise selecting the next higher priority level and repeating the preceding two steps.

5. A method as defined in claim 4 wherein currently allocated group bandwidth is determined at the intermediate node by:

for each link and priority group, computing a sum of the average bit rates and a sum of the average bit rate variances of existing connections; and for each link and priority group, storing the combined sums computed in the preceding step as the currently allocated group bandwidth.

6. In a multi-priority packet switching network having a plurality of nodes interconnected with links carrying multiple traffic connections wherein each connection is assigned a priority level and said priority levels are assigned to groups of consecutive priority levels, a system for determining whether to set up a requested connection on a given path through the network from an originating node to a destination node through at least one intermediate node, said system including:

subgroup creating means at each intermediate node for assigning, for each priority group on each outgoing link having at least two existing connections on the link, the priority levels of the existing connections to one of two or more subgroups and for communicating the subgroup definitions to other nodes in the network;

at the originating node, bandwidth allocation means for determining for each link on the given path, whether the bandwidth requirements for the requested connection can be satisfied, in sequence, from free bandwidth, from bandwidth already allocated for existing connections having priority levels assigned to lower priority groups than the group including the priority level of the requested connection, and where the subgroup including the priority level is not the lowest subgroup in its group as determined by subgroup definitions communicated from an intermediate node, from bandwidth already allocated to existing connections having priority levels already assigned to lower subgroups in its group; and connection control means responsive to a determination that bandwidth requirements can be satisfied for every link on the given path in accordance with the preceding step, to preempt existing connections as necessary to reassign bandwidth to the requested connection and then to establish the requested connection or, where bandwidth requirements cannot be satisified, to reject the requested connection.

7. A system as defined in claim 6 further including means for defining the subgroups within a group by periodically allocating a predetermined percentage of the bandwidth currently used for existing connections in the group to one of the subgroups, the boundary between adjacent subgroups being defined as a particular priority level.

8. In a multi-priority packet switching network having a plurality of nodes interconnected with links carrying multiple traffic connections wherein each connection is assigned a priority level and said priority levels am assigned to groups of consecutive priority levels, a system for determining whether to set up a requested connection on a given path through the network from an originating node to a destination node through at least one intermediate node, each intermediate nodes including means for assigning, for each priority group on each outgoing link from the intermediate node having at least two existing connections on the link, the priority levels of the existing connections to one of two or more subgroups and for communicating the subgroup definitions to other nodes in the networ, said system being implemented an an originating node and including:

bandwidth allocation means for determining for each link on the given path, whether the bandwidth requirements for the requested connection can be satisfied, in sequence, from free bandwidth, from bandwidth already allocated for existing connections having priority levels assigned to lower priority groups than the group including the priority level of the requested connection, and where the subgroup including the priority level is not the lowest subgroup in its group as determined by subgroup definitions communicated from an intermediate node, from bandwidth already allocated to existing connections having priority levels already assigned to lower subgroups in its group; and connection control means responsive to a determination that bandwidth requirements can be satisfied for every link on the given path in accordance with the preceding step, to preempt existing connections as necessary to reassign bandwidth to the requested connection and then to establish the requested connection or, where bandwidth requirements cannot be satisified, to reject the requested connection.

* * * * *